Oct. 23, 1928.
E. G. GARTIN
1,688,807
DRILLING MECHANISM
Filed Dec. 31, 1923
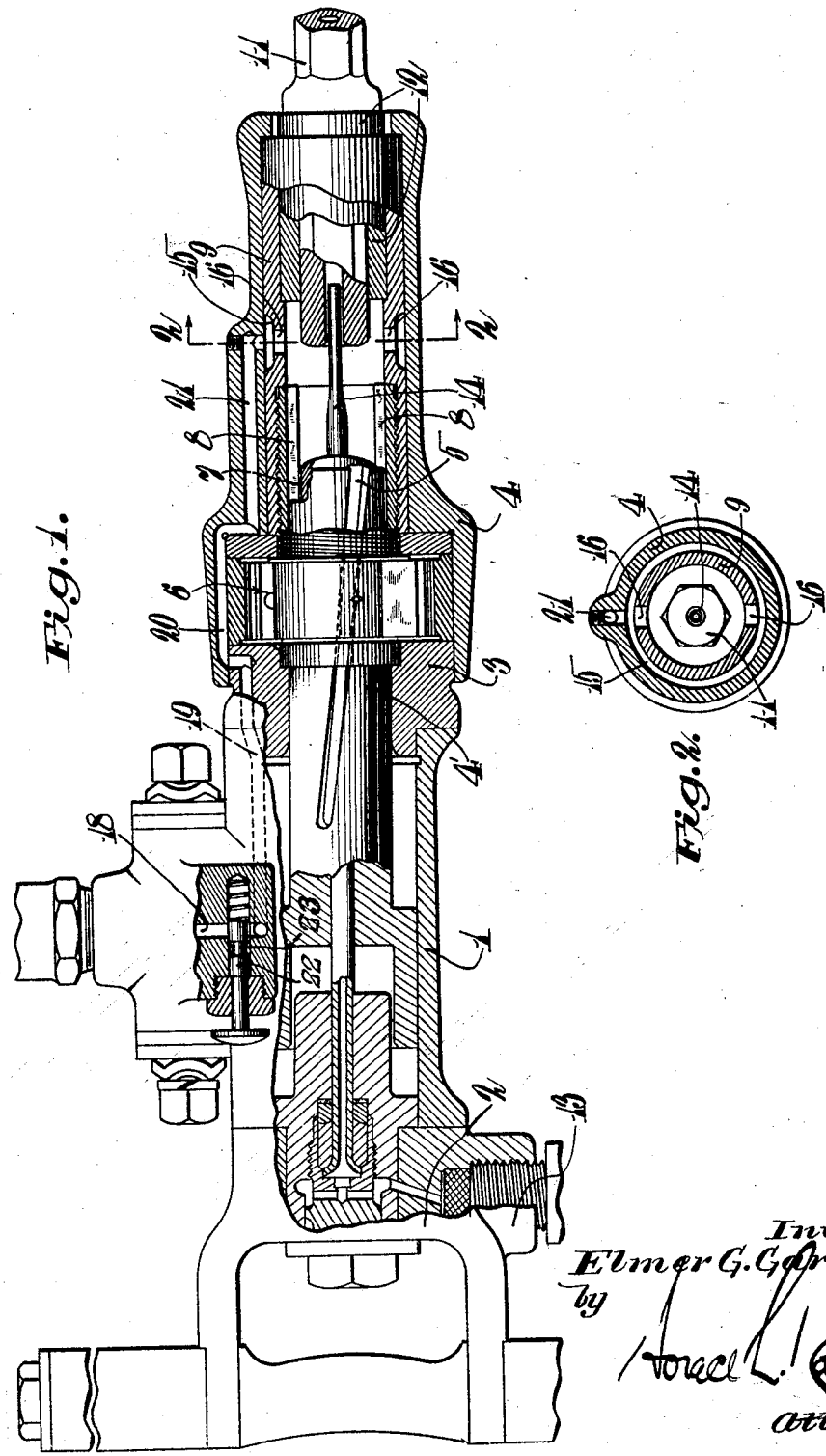
Inventor:
Elmer G. Gartin
by
Attorney.

Patented Oct. 23, 1928.

1,688,807

UNITED STATES PATENT OFFICE.

ELMER G. GARTIN, OF CLAREMONT, NEW HAMPSHIRE, ASSIGNOR TO SULLIVAN MACHINERY COMPANY, A CORPORATION OF MASSACHUSETTS.

DRILLING MECHANISM.

Application filed December 31, 1923. Serial No. 683,580.

This invention relates to drilling mechanisms, and more particularly to hole cleansing means therefor.

It has for its object to provide an improved hole cleansing means. A further object is to provide improved hole cleansing means using a supplementary supply of cleansing fluid. A further object is to provide improved means whereby the supplementary supply of cleansing fluid can be controlled at the will of the operator. A still further object is to provide improved supplementary cleansing means which cooperates with drill steel rotational mechanism. It is another object of my invention to provide improved cleansing fluid conducting means which cooperates with the chuck housing and rotatable chuck sleeve. It is also an object to provide improved means whereby a supplementary supply of cleansing fluid may be admitted to the steel independently of the operation of the drilling motor.

In the accompanying drawings I have shown for purposes of illustration one form which my invention may assume in practice.

In these drawings:—

Fig. 1 is a side elevation of a drilling motor, partly broken away to show details of construction, embodying my invention.

Fig. 2 is a transverse section on line 2—2 of Fig. 1.

In the ordinary use of a rock drilling mechanism employing hole cleansing means it is sometimes desirable to supplement the hole cleansing fluid so as to positively clear the hole of chips or other matter. It is also desirable to have rotational mechanism which will rotate the bit during such an operation and to accomplish both results I have shown as an illustrative embodiment of my invention a usual drilling mechanism comprising a cylinder 1 having rear and front heads 2 and 3, respectively, and a chuck housing 4 mounted upon the front head 3. Mounted within the cylinder is a reciprocable piston having a usual forwardly projecting hammer rifle bar 4' with spiral flutes 5 adapted to cooperate with any suitable rotational mechanism, herein shown as a pawl and ratchet mechanism 6 and also having straight grooves 7 cooperating with keys 8 fixed in the rear end of a chuck sleeve 9 rotatably mounted within the chuck housing 4. Thus upon reciprocation of the rifle bar 4', the chuck sleeve 9 will be intermittently rotated to cause rotation of a hollow drill steel 11 non-rotatably but longitudinally movable in a bushing 12 fixed in the forward end of the chuck sleeve. In the normal operation of the device actuating fluid in the motor will flow to the hollow portion of the drill steel as by the flutes 5 and this supply of cleansing fluid is supplemented by a liquid cleansing fluid conducted to the steel from inlet means 13 by a tube 14 fixed in the rear head 2 in any usual manner and which terminates within the hollow portion of the steel.

In order to supplement the cleansing fluids above referred to and without interrupting the operation of the motor in any way, I provide an annular recess 15 in the chuck sleeve intermediate its ends and substantially adjacent the plane in which the rifle bar contacts with the drill steel, this groove communicating with the chamber within which hammering action takes place as by ports 16. Passage means for conducting this supplementary supply from any suitable source 18 comprises a longitudinal passage 19 leading therefrom and passing through an offset passage 20 mounted within the rear end of the chuck housing and thence down along a passage 21 which communicates with the annular recess. Suitable means are provided for controlling the flow of fluid through said passages which comprises a manually controlled spring pressed piston 22 having an annular groove 23 between its ends and adapted upon being pushed inwardly to allow flow of fluid therethrough from a supply 18 to the passage 19 and upon being released to interrupt the flow, this piston being conveniently located relative to the drill handle and longitudinally of the drill cylinder.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a rock drill, a hammering motor comprising a cylinder and a piston reciprocable therein, a chuck housing removably secured to said cylinder, a chuck sleeve rotatably mounted in said housing, a hollow drill steel mounted in said sleeve, means including said sleeve and steel defining a chamber communicating with the bore in said steel, the walls of said cylinder and chuck housing and said chuck sleeve having connected passages formed therein in constant communication with said chamber, means for supplying pressure fluid through said passages and chamber to the bore in the drill steel for cleansing a drilled hole, and a valve operable from the rear end of the cylinder for controlling said supply.

2. In a rock drill, a hammering motor comprising a cylinder and a piston reciprocable therein, a chuck housing removably secured to said cylinder, a chuck sleeve rotatably mounted in said housing, a chuck bushing in the lower end of said sleeve, a drill steel mounted in said bushing, said sleeve, bushing, and steel defining a substantially closed chamber communicating with the bore in said steel, the walls of said cylinder and chuck housing having connected passages formed therein and said chuck sleeve having an annular groove communicating with said passage in the chuck housing and with said chamber, means for supplying pressure fluid through said passages and chamber to the bore in the drill steel for cleansing a drilled hole, and a valve operable from the rear end of the cylinder for controlling said supply.

In testimony whereof I affix my signature.

ELMER G. GARTIN.